UNITED STATES PATENT OFFICE.

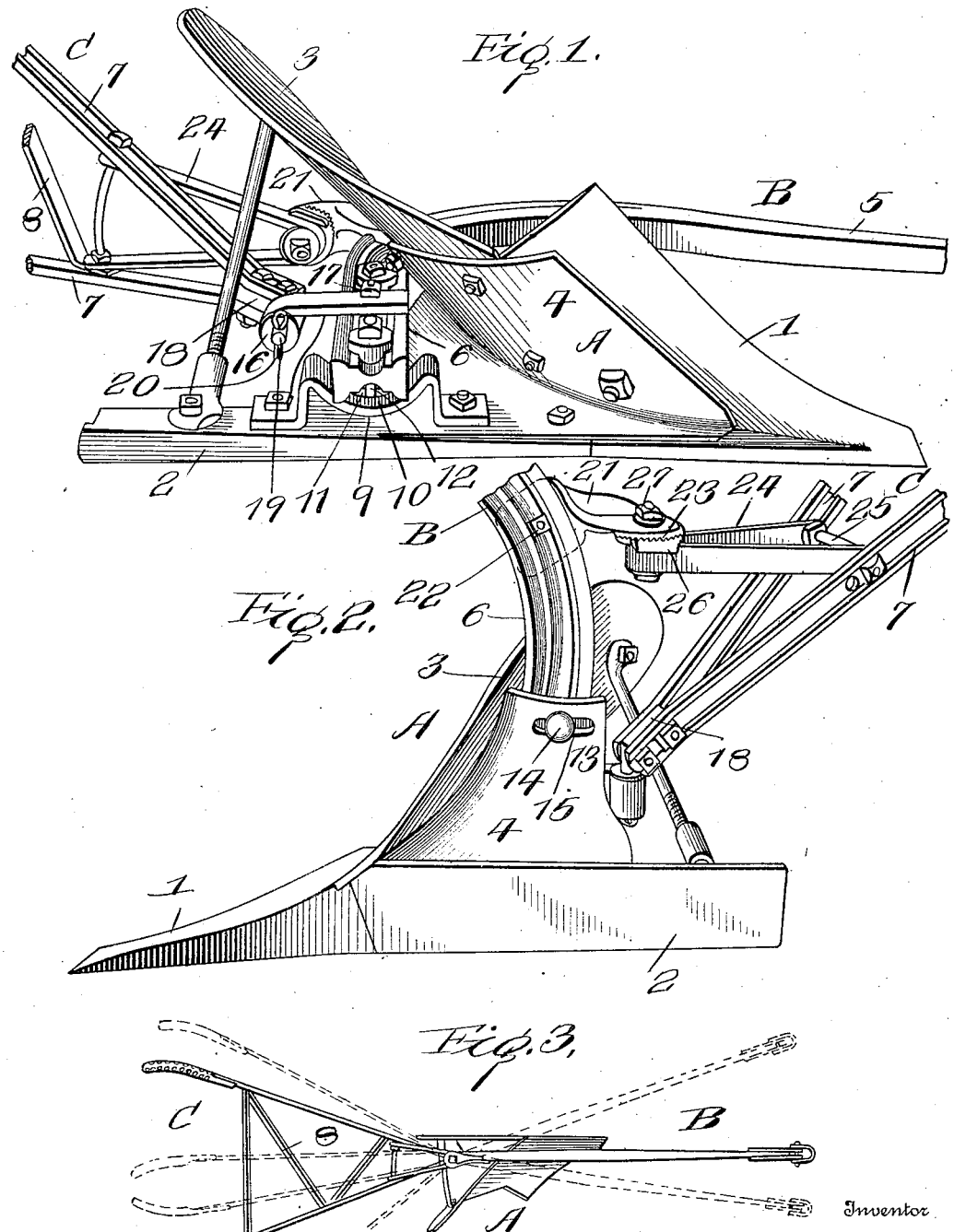

RICHARD PAYTON, OF MOLINE, ILLINOIS, ASSIGNOR TO DEERE & COMPANY, OF MOLINE, ILLINOIS, A CORPORATION OF ILLINOIS.

PLOW.

1,018,075.   Specification of Letters Patent.   Patented Feb. 20, 1912.

Application filed December 24, 1908. Serial No. 469,075.

*To all whom it may concern:*

Be it known that I, RICHARD PAYTON, a citizen of the United States, residing at Moline, in the county of Rock Island and State of Illinois, have invented certain new and useful Improvements in Plows, of which the following is a specification, reference being had therein to the accompanying drawing.

This invention relates to improvements in index beam plows.

The object of the invention is to provide a plow of strong and simple construction and with ready means of adjustment.

Figure 1 is a perspective view of a plow embodying my invention lying on its side. Fig. 2 is a side perspective view of the plow. Fig. 3 is a plan view of the plow showing by dotted lines the possible adjustments.

In the drawings A represents as a whole a plow body comprising the plow share 1, the land side 2, the mold board 3 and the frame or frog 4 to which the share, landside and moldboard are connected. This connection is preferably effected by means of bolts as shown in the drawing.

B represents the plow beam which is formed of one steel forging and comprises the forward portion 5 and the standard 6.

C represents the handles, comprising two handle bars 7 connected by suitable bracing means 8.

9 is a bridge or bracket mounted on the frame 4, and formed to present a vertical cylindrical surface 10, against which the lower end 6 of the beam B is secured by means of the bolt 12 passing through the slotted hole 11 in the bridge. The upper portion of the frame is extended and bent to form a cylindrical portion 13, in line with the cylindrical surface 10. The beam B is secured to this portion of the frame by the bolt 14 passing through the slotted hole 15.

16 is a bracket, secured to the standard by the bolt 17, and is bent at its rear end to form an eye.

18 is a hinge piece formed with the shank, 19 which is pivoted in the eye of the bracket 16 and is secured by the cotter pin 20. On the upper portion of this hinge piece are mounted the lower ends of the handle bars 7.

21 is a bracket extending backwardly from the standard, and secured to it by tne bolt 22. This bracket is provided with the radially notched horizontal disk 23 having its center in line with the eye of the bracket 16.

24 is a brace secured at its rear end to the handle bars 7, by the rod 25. The forward end of this brace carries the notched disk 26, adapted to engage with the notched disk 23, and it is secured thereto by the bolt 27.

In operation the position of the beam relative to the body may be adjusted by loosening the bolts 12 and 14, thus permitting the beam to be freely turned as desired, the bolts moving to new positions in the holes 11 and 15. Tightening the bolts rigidly secures the beam in place. The position of the handles may be adjusted by loosening the bolt 27, thus disengaging the notches on the disks 23 and 26, and permitting the movement of the handles. When they have been placed as desired, tightening the bolt 27 secures them positively in position.

Fig. 3 gives an indication of the variety of adjustments that may be had in a plow embodying my invention, thereby making it suitable for different classes of work. For instance the same plow may be adjusted for two or three horses or for hill side or level plowing. This plow is also well adapted for orchard or vineyard plowing as both the beam and the handles are adjustable to one side or the other to give proper clearance when the plow is used for turning a furrow either toward or away from the trees or vines.

The adjustable mounting of the handles entirely upon the beam, instead of upon the body, or partly on the body and partly on the beam, as has been done heretofore in plows of this class, is advantageous. It permits the adjustment of the body without changing the relative positions of the handles and beam, and at the same time in no way interferes with the adjustment of the handles relative to the body should that also be desirable.

I do not claim as a part of my present invention the specific form of handle mounting which I have shown and described. The handle mounting is made the subject of a separate application, Serial No. 619,850, filed April 8, 1911, as a division of this application.

What I claim is:

1. In a plow, the combination of a plow body having a part with a vertical horizontally curved surface, a plow beam having a standard provided with two parallel corners adapted to engage the said curved surface, at the said corners only, along two parallel lines of contact, and means for clamping the standard against the said curved surface in any one of a plurality of positions, substantially as set forth.

2. In a plow comprising a land side, a mold board and a share, the combination of a sheet metal frog for connecting the land side, mold board and share, the said frog having an integral part formed with a substantially vertical curved surface, a bracket separate from the frog but connected therewith, the said bracket being formed with a substantially vertical curved surface in alinement with the curved surface of the frog, a plow standard having a substantially vertical rear end part and means for rigidly clamping the said rear end part of the standard in adjusted position against the said vertical curved surfaces of the frog and of the bracket, substantially as set forth.

3. In a plow, the combination of a plow beam having its rear end forming a vertical pivot, a plow body adjustably mounted on the said pivot, and plow handles adjustably mounted and secured entirely upon the said plow beam independently of the said body, substantially as set forth.

4. In a plow, the combination of a plow beam, a plow body adjustably connected to the plow beam to move in a horizontal plane about an axis coincident with the rear end thereof, and plow handles mounted and secured entirely on the plow beam independently of the body and adapted to be adjusted horizontally to different angular positions, substantially as set forth.

5. In a plow the combination of a beam having a substantially vertical rear end part, a plow body mounted on the rear end part of the beam to swing about an axis coincident therewith, rearward extending brackets secured to the said rear end part of the beam and plow handles mounted on the said brackets for angular adjustment, substantially as set forth.

In testimony whereof I affix my signature, in presence of two witnesses.

RICHARD PAYTON.

Witnesses:
ROY E. ANDERSON,
EUGENE L. TAYLOR.

---

Copies of this patent may be obtained for five cents each, by addressing the "Commissioner of Patents, Washington, D. C."